United States Patent
Nomura

(10) Patent No.: US 7,584,775 B2
(45) Date of Patent: Sep. 8, 2009

(54) TIRE MOUNTER AND METHOD OF MOUNTING TIRE

(75) Inventor: Teruji Nomura, Kanagawa (JP)

(73) Assignee: Altia Co., Ltd., Kawasaki (JP)

( * ) Notice: Subject to any disclaimer, the term of this patent is extended or adjusted under 35 U.S.C. 154(b) by 0 days.

(21) Appl. No.: 11/787,953

(22) Filed: Apr. 18, 2007

(65) Prior Publication Data

US 2008/0128091 A1  Jun. 5, 2008

(30) Foreign Application Priority Data

Nov. 30, 2006  (JP) .............................. 2006-324644

(51) Int. Cl.
  *B60C 25/138*  (2006.01)
(52) U.S. Cl. ...................... 157/1.17; 157/1.22; 157/1.24
(58) Field of Classification Search ...................... 157/1, 157/1.1, 1.2, 1.22–1.28, 1.17
See application file for complete search history.

(56) References Cited

U.S. PATENT DOCUMENTS

| | | | | |
|---|---|---|---|---|
| 616,967 | A * | 1/1899 | Prescott ...................... | 157/1.22 |
| 1,587,634 | A * | 6/1926 | Ion et al. .................... | 157/1.22 |
| 2,900,017 | A * | 8/1959 | Lewis ........................ | 157/1.22 |
| 3,037,549 | A * | 6/1962 | Jacobson .................... | 157/1.22 |
| 3,557,862 | A * | 1/1971 | Mains ........................ | 157/1.24 |
| 3,815,653 | A * | 6/1974 | Scott et al. .................. | 157/1.24 |
| 4,830,079 | A * | 5/1989 | Onuma ........................ | 157/1.24 |
| 5,222,538 | A * | 6/1993 | Tomita et al. .................. | 157/1 |
| 5,472,034 | A * | 12/1995 | Corghi ....................... | 157/1.24 |
| 5,836,368 | A * | 11/1998 | Corghi ....................... | 157/1.24 |
| 7,264,032 | B2 * | 9/2007 | Peinelt et al. ............... | 157/1.22 |

\* cited by examiner

*Primary Examiner*—D. S Meislin
(74) *Attorney, Agent, or Firm*—Flynn, Thiel, Boutell & Tanis, P.C.

(57) ABSTRACT

The invention provides a tire mounter capable of preventing a tire from being damaged by minimizing a contact of a bead part of the tire relative to a wheel. The tire mounter, for receiving the wheel on which the tire is temporarily fixed aslant and mounting the tire on the wheel from a temporarily fixed state when mounting the tire, comprises a bead guide plate having an arc-shaped plate piece, the arc-shaped plate piece having a bottom surface side positioned on an upper surface side of the wheel, and an outer peripheral arc-shaped part positioned on an outer peripheral surface of the wheel. The bead guide plate is turned toward a bead part of the tire at a non-mounting side of the tire while being interlocked with a turning of a tire bead press roller, and thereby the bead guide plate turns ahead of the tire bead press roller so that the bead part of the tire at the non-mounting side of the tire slides on a surface side of the bead guide plate to be mounted on the wheel. With the configuration of this tire mounter, a contact load of the tire when mounting on the wheel can be significantly reduced, thereby minimizing the damage to the tire.

8 Claims, 9 Drawing Sheets

TIRE MOUNTER AND METHOD OF MOUNTING TIRE

FIELD OF THE INVENTION

The invention relates to a tire mounter for preventing a tire from being damaged by significantly reducing friction of bead parts of the tire relative to a wheel when the tire is mounted on the wheel, and a method of mounting the tire on the wheel using the tire mounter.

BACKGROUND OF THE INVENTION

According to a conventional tire mounter for mounting a tire on a wheel, a tire bead press roller to be pressed against an upper bead part side of the tire and a tire presser to be pressed against the upper bead part side of the tire are used. The tire bead press roller is turned from a state where the tire is normally temporarily fitted on the wheel aslant, while the upper and the lower bead parts of the tire are compelled to contact the outer periphery (edge part) of the wheel to be slid by two motions (two times mounting operation) or one motion (one time mounting operation), thereby mounting the tire on a predetermined position of the wheel. Such a conventional mounter is disclosed, for example, in JP 11-192823 A.

Meanwhile, in the foregoing conventional case where the bead parts of the tire to be mounted are forcibly slid on the periphery (edge part) of the wheel while being compelled to contact the same, a friction force of the tire when contacting the wheel becomes considerably large and brings about a concern that the bead parts are prone to be damaged.

For example, in the case of a small-sized and thin tire, even if the bead parts of the tire are forcibly slid, they are not much damaged, while in the case of a large-sized and thick tire (radial tire, low-profile tire, and so forth), the bead parts are hard and have a considerable rigidity and a large load (friction force) is generated when the bead parts contact the wheel. Particularly, since many core members such as steel wires are normally embedded in the tire, particularly in the case of a rubber tire, if the tire is forcibly compelled to contact the wheel, it was found from the experiment made by the present inventor that a load applied to the tire when the tire contacts the wheel in the case of mounting the tire T on the wheel H (hereinafter referred to as contact load) reaches about 100 Kg to the maximum of about 340 Kg (the maximum value in a specific direction of three dimensional directions of x, y and z when the contact load is divided into three dimensional directions).

The inventor of this application studied this point more in detail and it was found that if the contact load is large, especially the upper bead part of the tire is prone to be damaged with ease. The outer side of the bead part has sufficient strength since it is exposed to the outside, while the inner side of the bead part does not have sufficient strength such as the strength of the outer side of the bead part, because it is positioned inside the wheel when the tire is mounted on the wheel.

Accordingly, in the case of the tire which was temporarily fixed on the wheel aslant, when the lower bead part of the tire is mounted on the wheel, a strong outer side of the lower bead part is compelled to contact the outer periphery of the wheel, so that the tire is not damaged significantly. However, when the upper bead part of the tire is mounted on the wheel, an inner side of the upper bead part (part which is weak in strength) is compelled to contact the outer periphery of the wheel, the level of damage of the tire is prone to be large. It is more troublesome that once the tire is mounted on the wheel, the level of the damage (generation of cracks and so forth) at the inner side of the bead part of the tire cannot be seen from the outside so that such damage is hardly found out and forms hidden defects. The cracks of the tire grow with time, and it is found when abnormality occurs to the tire during the traveling of the tire.

Accordingly, it is conceived that the interval (gap) between the wheel and the tire bead press roller is made large in order to reduce the contact load of the tire. If this interval is made large, the biting of the tire relative to the wheel becomes inferior and causes a new problem that an excellent mounting of the tire is not guaranteed.

To that end, it is adjusted in the conventional mounter that the speed of the tire bead press roller to approach the wheel is compelled to slow down in order to optimize the interval between the wheel side and the tire bead press roller, thereby minimizing the contact load of the tire. On the contrary, when the wheel side, namely, the lift table side, approaches the tire bead press roller, the approaching speed is compelled to slow down in front of the tire bead press roller. Alternatively, both the approaching speed of the tire bead press roller and that of the lift table side are controlled, or dimensions of wheels (because in the case of the wheels manufactured mainly by moulding, dimensions are varied widely) are measured beforehand. The information of the measurement is used for controlling both of the approaching speeds. In this case, additional steps are increased, inevitably lowering the efficiency caused by slowing down the speed when mounting the tire on the wheel.

Accordingly, the inventor of this application provides a bead guide plate which serves as a guide pallet for reducing friction and which is turned while being positioned on the upper surface side of the wheel in order to reduce the contact load of the bead part of the tire temporarily fixed on the wheel aslant at the non-mounting side of the tire when mounting the tire on the wheel. The bead guide plate is, therefore, inserted into a bead part of the tire which is positioned at the inner side of the outer peripheral surface of the wheel at the non-mounting side, thereby causing the bead guide plate to turn ahead of the bead part of the tire at the non-mounting side of the tire. As a result, when the bead part of the tire at the non-mounting side is pressed by the tire bead press roller, it is guided to be slid from the surface side of the bead guide plate which is positioned in the manner of overlapping the upper surface side of the wheel, so that the tire can be mounted smoothly on the wheel with minimum contacts to the wheel side. Further, it was found that the contact load was significantly reduced (the maximum value of the contact value in a specific direction of three dimensional directions of x, y and z is reduced to about 20 Kg, and will be described in detail later).

SUMMARY OF THE INVENTION

The invention has been developed from the foregoing point of view and it is an object of the invention to provide a mounter for significantly reducing friction applied to bead parts of a tire relative to a wheel to excellently prevent the tire from being damaged, and a method of mounting the tire on the wheel using this mounter.

The mounter of the first embodiment of the invention for receiving the wheel on which the tire is temporarily fixed aslant and mounting the tire on the wheel by turning a tire bead press roller about a center cone from a temporarily fixed state when mounting the tire. The tire mounter comprises a bead guide plate having an arc-shaped plate piece, the arc-shaped plate piece having a bottom surface side positioned on an upper surface side of the wheel, and an outer peripheral arc-shaped part positioned on an outer peripheral surface of the wheel. The bead guide plate is turned toward a bead part of the temporarily aslant fixed tire at the non-mounting side of the tire while being interlocked with a turning of the tire bead press roller and thereby the bead guide plate turns ahead of the tire bead press roller so that the bead part of the tire at the non-mounting side of the tire slides on a surface side of the bead guide plate to be mounted on the wheel.

The tire mounter according to the second embodiment of the invention further comprises a lubricating liquid supply means for supplying a lubricating liquid to the bead guide plate.

The tire mounter according to the third embodiment of the invention further comprises an additional bead guide plate spaced apart from the existing bead guide plate at appropriate intervals while a base end part of the arc-shaped plate piece of the existing bead guide plate is opposed to a base end part of an arc-shaped plate piece of the additional bead guide plate.

The tire mounter according to the fourth embodiment of the invention has a feature that the bead guide plate includes an outer diameter adjustment mechanism comprising a cam plate being fitted to a rotary shaft side of the center cone, a guide cam part of the cam plate, a lever piece being mounted on the guide cam part and interlocked with the guide cam part, and being fixed to the base end part of the arc-shaped plate piece of the bead guide plate in a substantial L-shape by a connection upright standing part, and an extendable mechanism of the bead guide plate, wherein a turning radius of the bead guide plate is varied in response to sizes of the tire and the wheel.

A method of mounting the tire on the wheel using the mounter disclosed in the first embodiment of the invention comprises the steps of turning the tire bead press roller about a center cone from a temporarily fixed state, mounting a lower bead part of the tire on the wheel by forwardly turnably driving the bead guide plate, and subsequently mounting an upper bead part of the tire on the wheel by backwardly turnably driving the bead guide plate.

The second method of mounting a tire on a wheel using a mounter disclosed in the first embodiment of the invention comprises the steps of turning the tire bead press roller about a center cone from a temporarily fixed state, and mounting the lower and the upper bead parts of the tire on the wheel by turnably driving the bead guide plate at one time.

According to the tire mounter of the invention, since the arc-shaped plate piece is provided on the bead guide plate, when the tire is mounted on the wheel, the bead guide plate is compelled to turn ahead of the bead part of the tire which is temporarily fixed on the wheel aslant at the non-mounting side of the tire, so that the bead guide plate serves as a guide pallet for reducing, thereby obtaining a smooth mounting of the bead part of the tire on the wheel.

As a result, the contact load can be significantly reduced when mounting the tire on the wheel (the maximum value of the contact value in a specific direction of three dimensional directions of x, y and z is reduced to about 20 Kg, and will be described in detail later).

In other words, the damage to the tire can be significantly reduced. As a result, a large damage prevention effect can be obtained. Abnormality of the tire which has been first found conventionally with the lapse of time after the tire is mounted on the wheel can be prevented beforehand. Further, from this fact, an overhaul for inspecting damages to the tire by sampling inspection which has been carried out conventionally after mounting the tire on the wheel is not necessary.

According to the mounter of the invention, if the lubricating liquid supply means is additionally provided for supplying (atomizing and so forth) a lubricating liquid such as liquid soap which is rich in smoothness to the bead guide plate and the periphery, more smooth mounting of the tire can be implemented.

According to the mounter of the invention, in the case where two sets of bead guide plates are provided while they are spaced apart from each other at appropriate intervals, if the mounting of the tire is implemented by two motion mounting system, each of the bead guide plates can be appropriately used when forwardly turnably driven or when backwardly turnably driven, thereby achieving an effective mounting.

According to the mounter of the invention, if the bead guide plate is additionally provided with an outer diameter adjustment mechanism, it can smoothly cope with tires and wheels having various sizes. That is, it is possible to obtain a more versatile mounter.

According to the method of mounting the tire of the invention using the foregoing mounter, a lower bead part of the tire is first mounted on the wheel when the bead guide plate is forwardly turnably driven. Subsequently, an upper bead part of the tire can be mounted on the wheel when the bead guide plate is backwardly turnably driven. The two-motion mounting system is particularly useful in the case where the tire has high rigidity (radial tire, low-profile tire, and so forth).

According to the method of mounting the tire of the invention using the foregoing mounter, the lower and the upper bead parts of the tire can be mounted on the wheel by turnably driving the bead guide plate at one time. As a result, it is possible to obtain a very high operability. This one-motion mounting system is particularly useful in the case where the tire is small-sized and has low rigidity.

PREFERRED EMBODIMENT OF THE INVENTION

Figure 1:
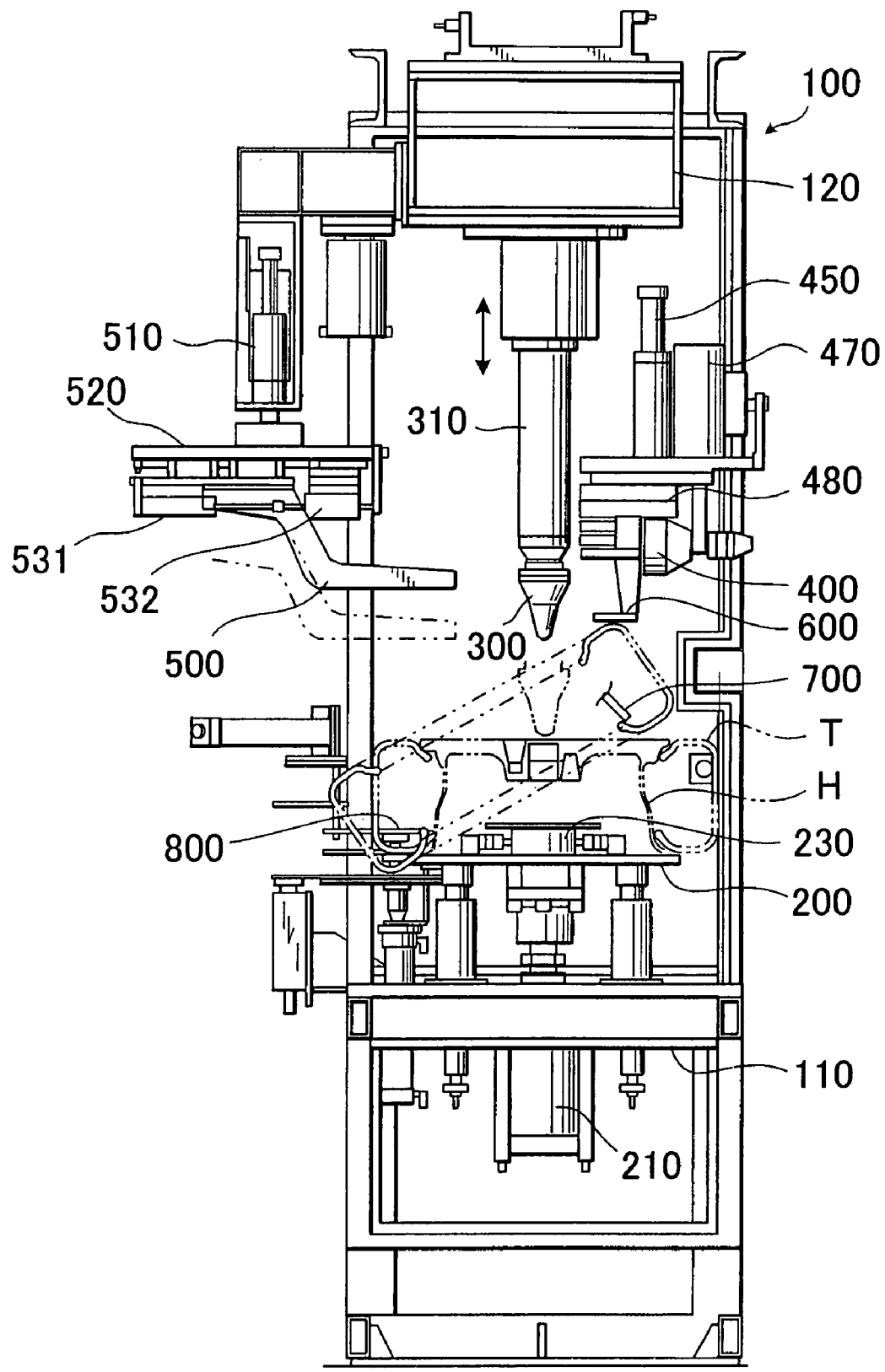
FIG. 1 is a front view showing the entire mounter of the invention.
Figure 2:
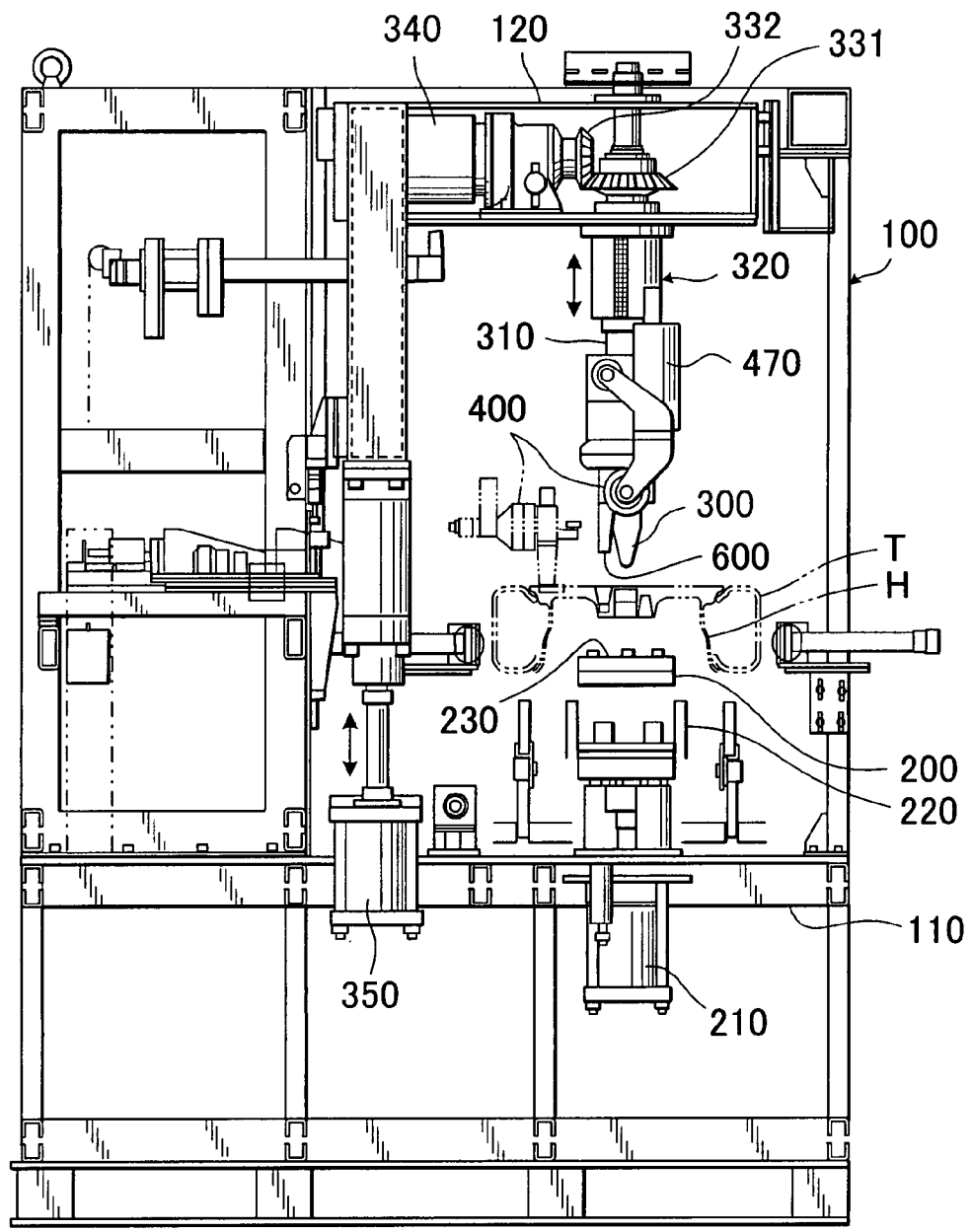
FIG. 2 is a side view of the mounter in FIG. 1.

FIG. 1 and FIG. 2 are views showing the entire tire mounter of the invention.

Figure 3:
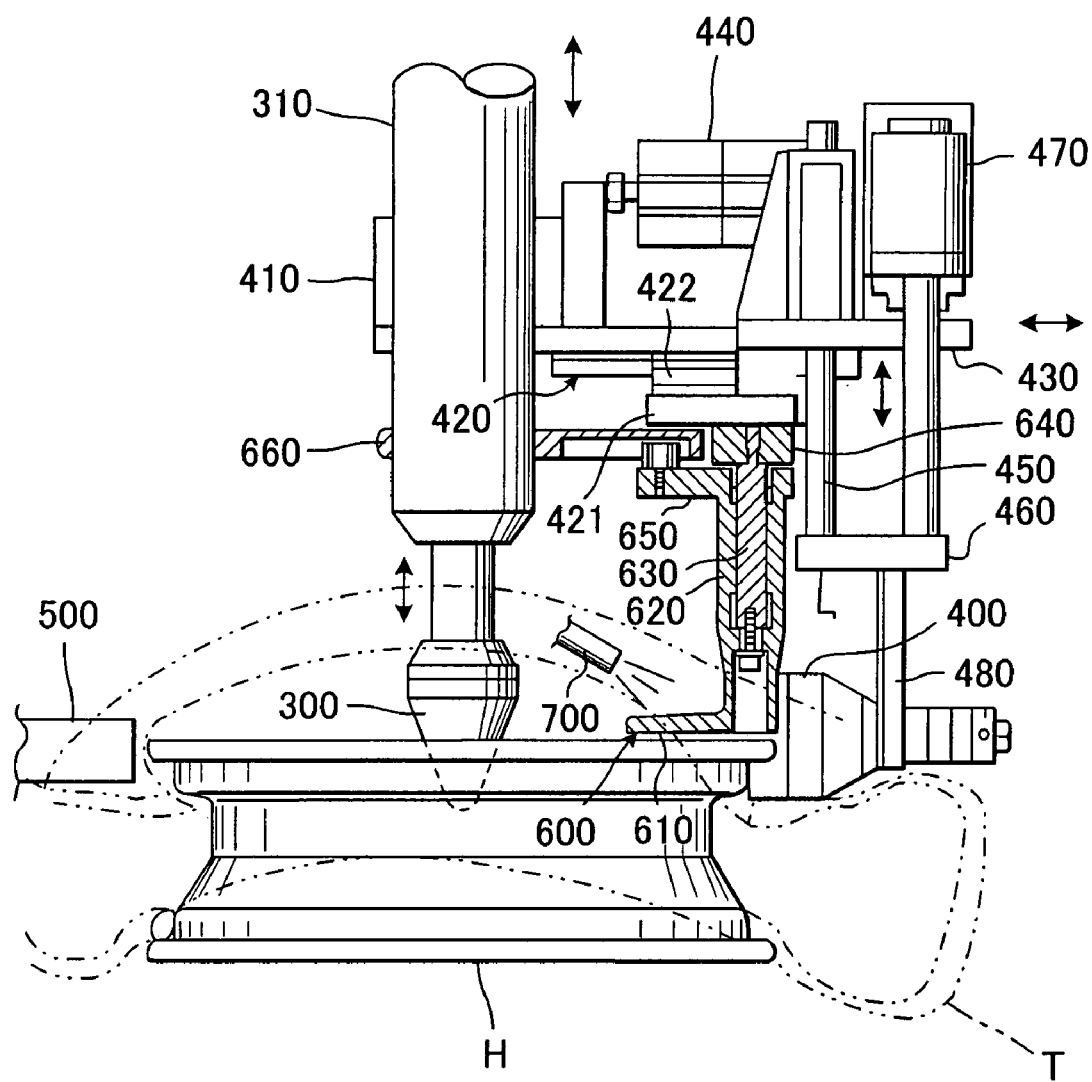
FIG. 3 is a partially longitudinal enlarged view showing a state of assembling between the tire bead press roller and the bead guide plate of the invention.

In the same figures, depicted by 100 is a machine frame formed of a frame member such as a steel frame constituting a frame of a main body of the mounter, 200 is a lift table (wheel receiving table) on which a wheel H having a tire T which is temporarily fixed thereon aslant is placed, 300 is a center cone which is moved up and down relative to a wheel center hole of the wheel H placed on the lift table 200 and is rotatably mounted on a center cone shaft part 310, which will be described in detail later, 400 is a tire bead press roller which is pressed against an upper bead part side of the tire T, 500 is a tire presser which is pressed against the upper bead part side of the tire, 600 is a bead guide plate formed of an arc-shaped plate piece which is newly employed by the invention, and positioned and turned at the upper surface side of the wheel H when the tire T is mounted, and which functions as a kind of a guide pallet for reducing friction applied to the tire T, 700 is a lubricating liquid supply means such as an atomizer nozzle for supplying a lubricating liquid such as liquid soap, a surface-active agent which is rich in smoothness to the bead guide plate 600 and the periphery thereof (FIG. 1, FIG. 3). Meanwhile, the bead guide plate 600 may be structured as the lubricating liquid supply means 700 such that the bead guide plate 600 is provided with a path inside thereof for a lubricating liquid and a plurality of jetting ports on the surface side thereof, enabling the lubricating liquid to be supplied more smoothly.

The lift table 200 is installed, for example, substantially at the middle portion of the machine frame, and can be moved up and down by an elevating mechanism 210 such as a hydraulic cylinder fitted to a lateral frame member 110 of the machine frame 100. A tire receiver 800 is provided at the portion close to the lift table 200 (left side in FIG. 1) for receiving the lower side of the tire T which is temporarily fixed aslant on the wheel H, and is moved up and down while being interlocked with the ascent and the descent of the lift table 200. The wheel H on which the tire T is temporarily fixed aslant is carried in the lift table 200 through a carrier means 220 (FIG. 2) such as a conveyor, and the wheel H on which the tire T was mounted is carried out from the lift table 200.

The center cone 300 is provided to be movable up and down, and it is inserted into the wheel center hole of the wheel H (the wheel in a state where the tire T is temporarily fixed thereon aslant) which is placed on the lift table 200, thereby fixing the wheel H. The center cone 300 is rotatably mounted on the center cone shaft part 310 for holding by a bearing mechanism (not shown) when fixing the wheel H. Further, when fixing the wheel H, the wheel H may be fixed using a wheel brake mechanism 230 (FIG. 2, for example, a member having an extendable pressing part to be pressed against the side surface of the wheel H) that is additionally provided on the lift table 200. As a result, the wheel H can be fixed reliably. The wheel H and the tire T have various sizes, and a wheel width and a tire width are varied in response to their sizes so that a stop position of the lift table 200 is set to correspond to the width when fixing the wheel H.

The center cone shaft part 310 of the center cone 300 is rotatably connected to a connection part 331 such as a bevel gear mounted in its shaft on a movable frame part 120 of the machine frame 100 via an upper unit part 320 as shown in FIG. 2. The connection part 331 is connected to an electric motor 340 via a connection part 332 such as a bevel gear which meshes with the connection part 331. That is, the center cone shaft part 310 is rotated when the electric motor 340 is rotatably driven.

Meanwhile, the movable frame part 120 of the machine frame 100 is structured to be moved up and down by an elevating mechanism 350 such as a hydraulic cylinder fitted to the lateral frame member 110 of the machine frame 100, as shown in FIG. 2. The rough ascent and the rough descent of the center cone 300 are implemented by the ascent and the descent of the movable frame part 120 operated by the elevating mechanism 350, while the ascent and the descent of the center cone 300 per se are implemented by an elevating mechanism (not shown) built in the center cone shaft part 310.

Further, the tire presser 500 is additionally provided on the movable frame part 120 of the machine frame 100. More in detail, the tire presser 500 is fitted to a tire press holding part 520 which is suspended from the movable frame part 120 to be movable up and down relative to the movable frame part 120 by an elevating mechanism 510 such as a hydraulic cylinder so as to be advanced or retracted horizontally by extendable mechanisms 531, 532 such as a pair of advancing and retracting hydraulic cylinders. That is, the tire presser 500 is structured to be moved up and down or horizontally advanced or retracted in response to sizes of the tire T and the wheel H.

The tire bead press roller 400 and the bead guide plate 600 are in cooperation with each other relative to the center cone shaft part 310 of the center cone 300 as shown in FIG. 3.

First, the tire bead press roller 400 concretely comprises a fixed arm part 410 which is horizontally fixed to the center cone shaft part 310, a movable arm 430 which is extendably connected to the fixed arm part 410 via a sliding mechanism 420 such as a thrust bearing, an extendable mechanism 440 such as a hydraulic cylinder fitted between the movable arm 430 and the fixed arm part 410, and an elevating holder part 460 for the tire bead press roller 400 which is suspended from the movable arm 430 side via a guide mechanism 450 such as a guide rod, an elevating mechanism 470 such as a hydraulic cylinder fitted between the elevating holder part 460 and the movable arm 430, and a suspension bracket 480 which is suspended from the elevating holder part 460. The components are assembled together as a whole.

With this assembled structure, the tire bead press roller 400 is rotated while being interlocked with the rotation of the center cone shaft part 310. Meanwhile, since the movable arm 430 is slid to be advanced and retracted when the extendable mechanism 440 is driven, the position of the tire bead press roller 400 can be adjusted in response to sizes of the wheel H and the tire T (width and height).

Figure 4:
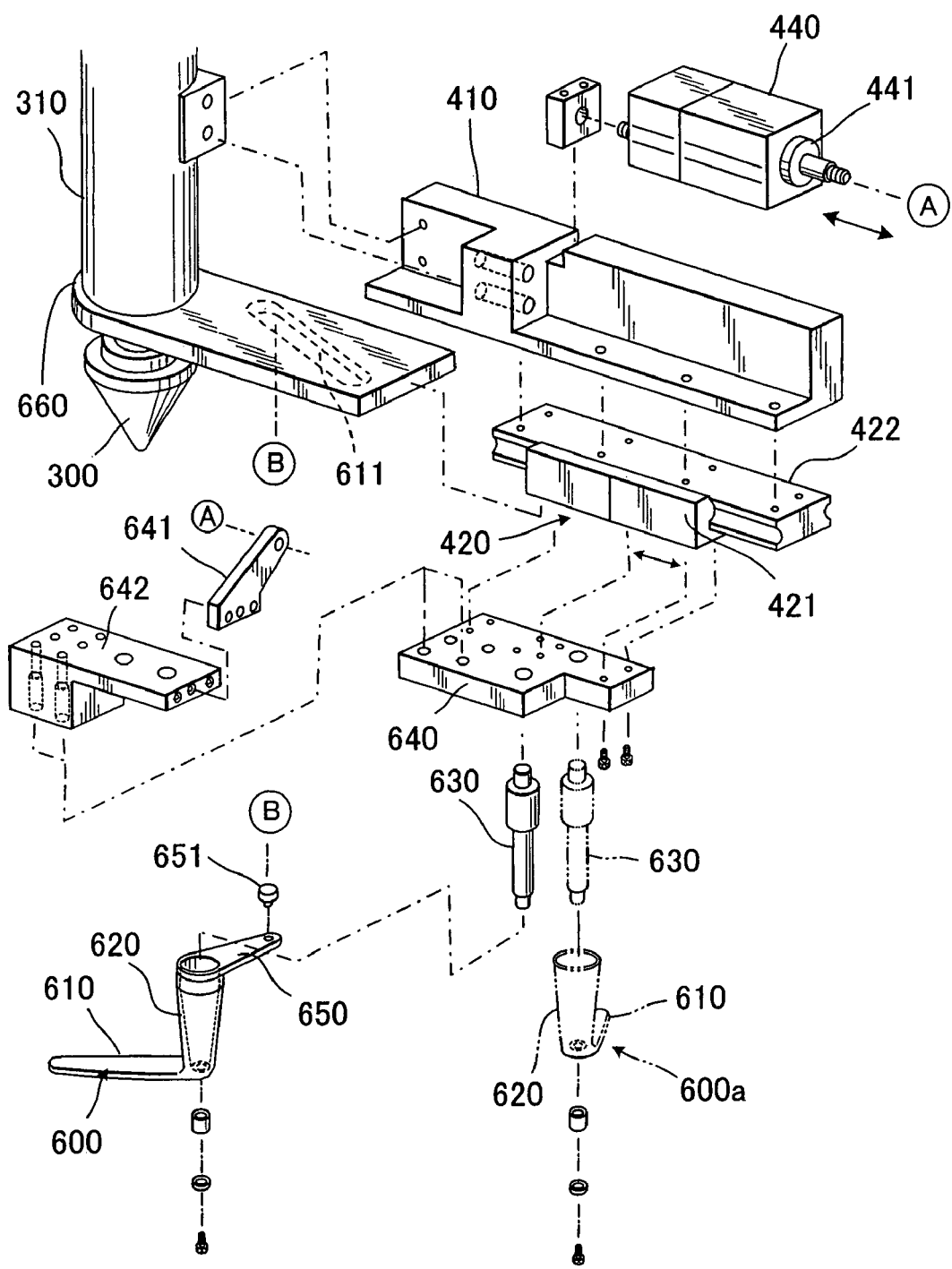
FIG. 4 is an exploded perspective view corresponding to the part shown in FIG. 3.
Figure 6:
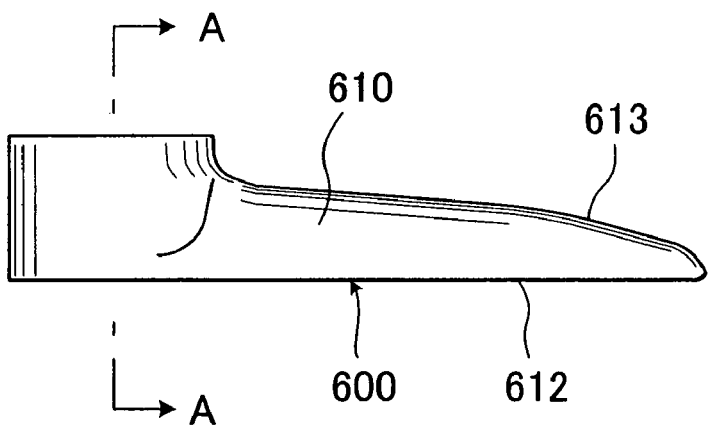
FIG. 6 is a side view of the arc-shaped plate piece shown in FIG. 5.
Figure 7:
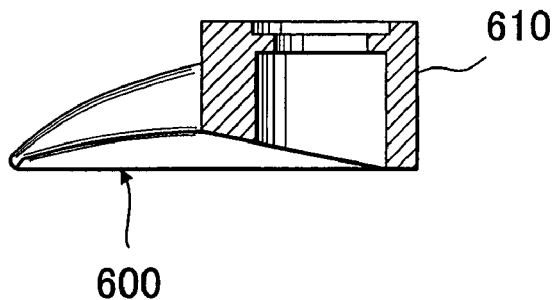
FIG. 7 is a longitudinal sectional view taken along line A-A in FIG. 6.

Meanwhile, the bead guide plate 600 is also assembled with various components, most of which is commonly used as those of the tire bead press roller 400, as shown in FIG. 3 and FIG. 4. More in detail, the shapes of an arc-shaped plate piece 610 of the bead guide plate 600 are illustrated as shown in FIG. 5 to FIG. 7.

Figure 5:
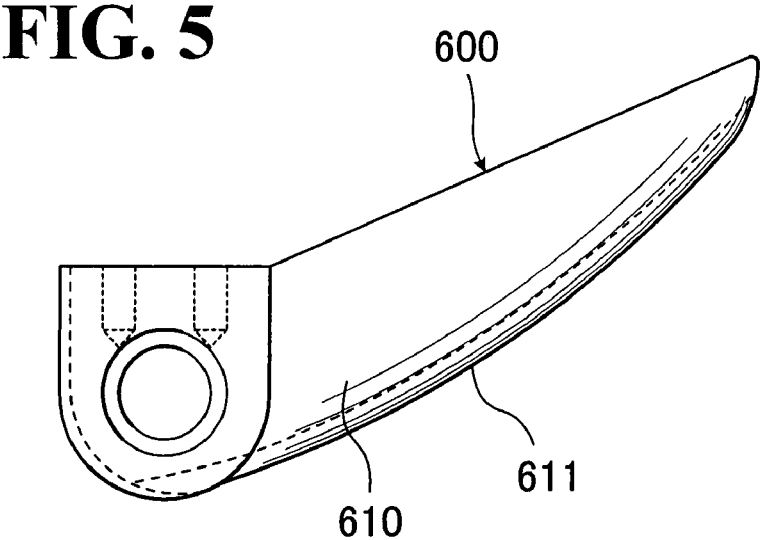
FIG. 5 is a plan view of the arc-shaped plate piece of the bead guide plate of the invention.

As shown in FIG. 5, the bead guide plate 600 has an outer peripheral arc-shaped part 611 at a bottom right side of FIG. 5, and it is a part to be positioned while being aligned with an outer peripheral surface of the wheel H. In FIG. 6, the bead guide plate 600 has a bottom surface part 612 at a lower side of FIG. 6, and it is a part to be positioned close to the upper surface side of the wheel H. The bead guide plate 600 has a gentle slope (sloping part) 613 formed on the outer surface side toward the tip end thereof.

The slope gentle slope 613 is provided for causing the tip end side of the bead guide plate 600 to be easily put (inserted) into a contact portion A between the wheel H and the bead part of the tire T which is not mounted on the wheel H, when the bead guide plate 600 is turnably moving, which will be described in detail later. The length of the bead guide plate 600 (L in FIG. 10) is set not to obstruct the wheel H and the tire T sides.

At one end (base end part) of the arc-shaped plate piece 610 of the bead guide plate 600, there is provided with a cylindrical connection upright standing part 620, as shown in FIG. 3 and FIG. 4. Rod shaft members 630 mounted in shaft on the cylindrical connection upright standing part 620 are fitted to one of slide members 421, 422 (slide member 421 in this case) which slide on each other and constitute the sliding mechanism 420 such as the thrust bearing of the tire bead press roller 400 via an assembly block member 640. A retraction rod 441 of the extendable mechanism 440 at the tire bead press roller 400 is connected to the assembly block member 640 via a connection piece 641 and a connection block member 642. Accordingly, when the extendable mechanism 440 is driven, the bead guide plate 600 advances and retracts in a radial direction of the center cone shaft part 310 while being interlocked with the driving of the extendable mechanism 440.

Further, a lever piece 650 is provided on the upper end side of the connection upright standing part 620 of the bead guide plate 600, and the tip end of the lever piece 650 is assembled with a guide cam part 661 of a cam plate 660 which is horizontally fixed to the center cone shaft part 310 via a rotary roller 651. In this example, since the cam plate 660 is positioned under the assembly block member 640, the guide cam part 661 becomes a long hole (groove) which is opened downward.

Figure 8:
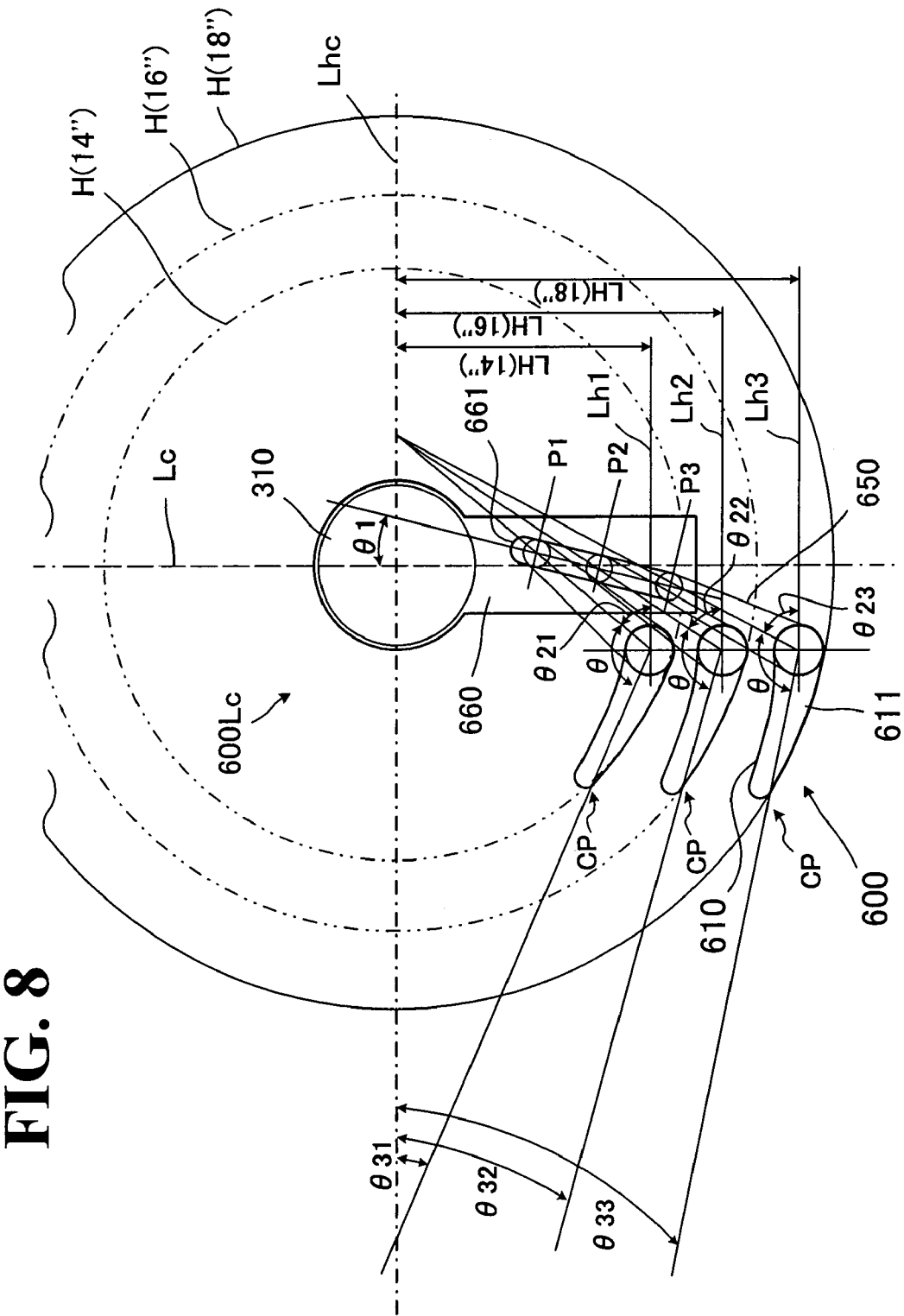
FIG. 8 is a schematic plan view showing an operation of the outer diameter adjustment mechanism of the bead guide plate.

The cooperative (positional) relation between the bead guide plate 600, the lever piece 650 and the cam plate 660 is illustrated in FIG. 8.

The lever piece 650 is fitted to the bead guide plate 600 in a substantial L-shape, and the guide cam part 661 of the cam plate 660 in which the rotary roller 651 of the lever piece 650 is assembled is tilted (tilting angle θ1) clockwise relative to a center line Lc which passes through the center of the center cone shaft part 310 at the cam plate 660 as shown in FIG. 8.

With such a configuration, when the extendable mechanism 440 at the tire bead press roller 400 is driven, one end of the lever piece 650 (rotary roller 651) is moved along the guide cam part 661 of the cam plate 660 (e.g., between P1 to P3), as shown in FIG. 8, so that the turning radius of the bead guide plate 600 (the distance from the center of the center cone shaft part 310 to an outer peripheral surface of the outer peripheral arc-shaped part 611 of the arc-shaped plate piece 610 in the bead guide plate 600) is adjusted.

At this point in time, the angle θ formed between the center line of the bead guide plate 600 and that of the lever piece 650 is kept constant, but the tip end position (CP) of the bead guide plate 600 is moved as shown in FIG. 8. That is, the position of the outer peripheral arc-shaped part 611 of the bead guide plate 600 is properly varied in response to the size of the wheel H. It is desired that the outer peripheral arc-shaped part 611 is preferably positioned while being aligned (substantially flushing) with the outer peripheral surface of the wheel H.

These components become an outer diameter adjustment mechanism 600Lc in the bead guide plate 600. Between respective angles, namely, angles (θ21 to θ23) formed between the center line of the lever piece 650 and respective horizontal lines Lh1 to Lh3 from the horizontal center line (Lhc, the line orthogonal to the center line Lc of the center cone shaft part 310) in response to the sizes of the wheel H, and angles (θ31 to θ33) formed between the horizontal center line Lhc and the center line of the bead guide plate 600 establish the following relation when the bead guide plate 600 is varied, namely, θ21<θ22<θ23 and θ31<θ32<θ33.

Figure 9:
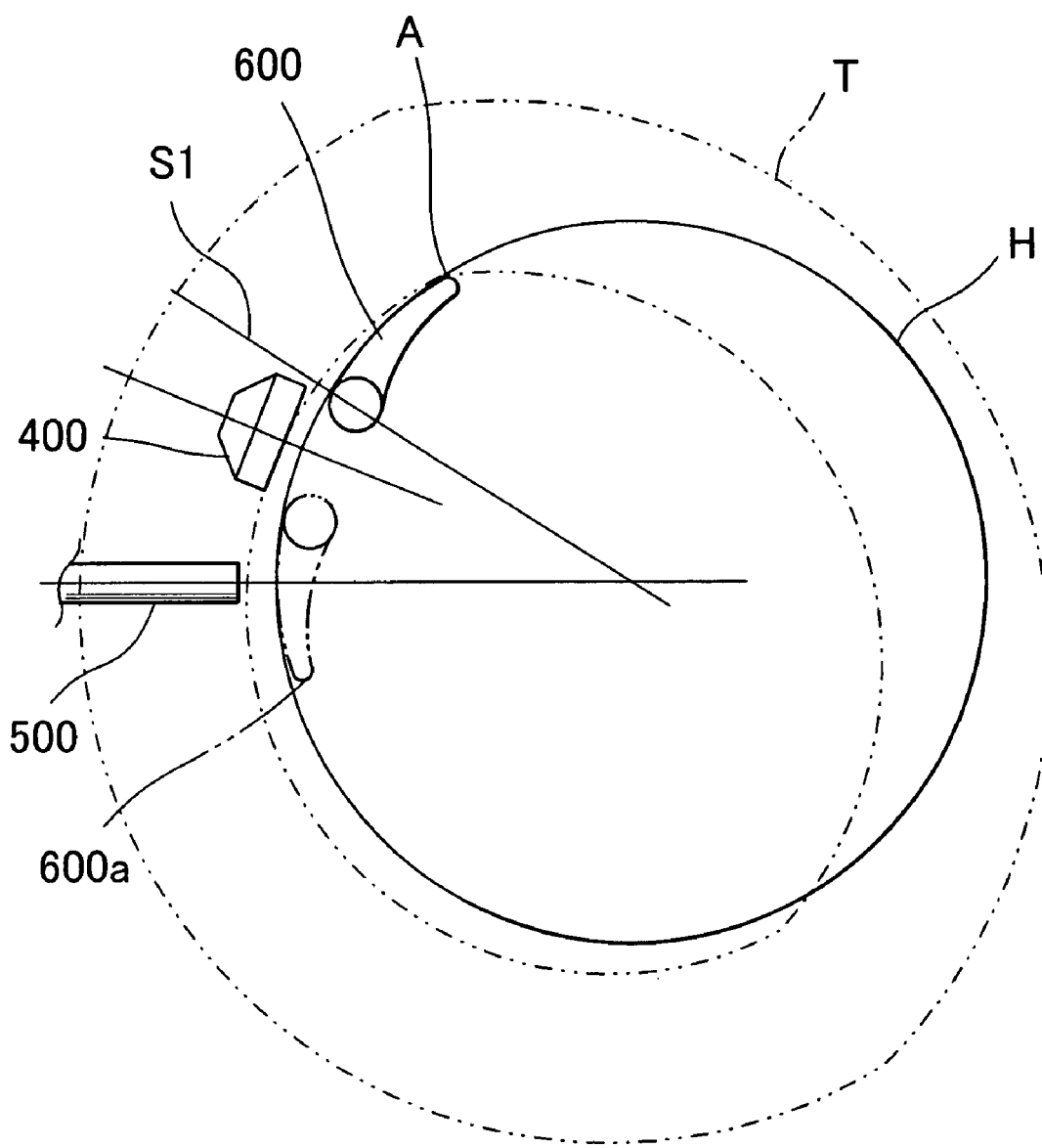
FIG. 9 is a view showing positional relation between the tire bead press roller, the bead guide plate and the tire presser of the invention.

With this configuration, one bead guide plate 600 is sufficient, but an additional bead guide plate 600a may be provided so as to be symmetrical with the left side bead guide plate 600 (solid line) as shown in a chain line in FIG. 4 and FIG. 9. That is, the bead guide plate 600 is structured to be used in the manner that the bead guide plate 600 shown by the solid line is used when it is forwardly turnably driven while the additional bead guide plate 600a shown in the chain line is used when it is backwardly turnably driven.

With the tire mounter having such a configuration, the tire T is mounted on the wheel H in the following manner. Described first is the case of the two-motion mounting system where upper and lower bead parts of the tire T are separately mounted by the single bead guide plate 600.

Before mounting the tire T on the wheel H, an initial operation of the tire mounter is started in response to the various sizes of the tire T and the wheel H. The extendable mechanism 440 of the tire bead press roller 400 is first driven in response to an outer diameter of the wheel H to compel the tire bead press roller 400 to be positioned at a predetermined position (temporary position), and to compel the bead guide plate 600 to be positioned at a predetermined position (temporary position) by the agency of the outer diameter adjustment mechanism 600Lc. Further, the elevating mechanism 350 is driven in response to the width of the wheel H to compel the upper unit part 320 to be positioned at a predetermined position (temporary position) via the movable frame part 120 of the machine frame 100.

Thereafter, the lift table 200 in which the wheel H having the temporarily aslant fixed tire T is carried so as to be placed thereon, and the tire receiver 800 is moved upward at a predetermined height.

At the same time, the center cone 300 is moved downward and engages in the wheel center to fix the wheel H. At this point in time, the ascent of the lift table 200 is implemented by the driving of the elevating mechanism 210. Further, the descent of the center cone 300 is implemented by the driving of the elevating mechanism which is built in the center cone shaft part 310.

Owing to the descent of the upper unit part 320 accompanied by the descent of the center cone 300, the bead guide plate 600 is set at a regular start position relative to the wheel H. That is, the bottom surface part 612 of the arc-shaped plate piece 610 is positioned close to the upper surface side of the wheel H, and the outer peripheral arc-shaped part 611 is positioned while being aligned with the outer peripheral surface of the wheel H (substantially in the manner of flushing therewith). At this point in time, it is preferable that the wheel brake mechanism 230 is also driven, thereby fixing the wheel H with more reliability. Further, the elevating mechanism 470 is driven to set the tire bead press roller 400 at a predetermined start position.

The positional relation between the tire bead press roller 400, the bead guide plate 600 and the tire presser 500 when the operation of the tire mounter is started is illustrated in FIG. 9.

In the case where the tire bead press roller 400 and the bead guide plate 600 are turned clockwise relative to the wheel H in FIG. 9, the bead guide plate 600 is positioned in front of the tire bead press roller 400 to turn ahead of the tire bead press roller 400. The bead guide plate 600 is positioned such that the outer peripheral arc-shaped part 611 is aligned with the outer peripheral surface of the wheel H, as set forth above.

When the tire mounter is operated, the lower bead part at the lower side of the tire T is first placed on the wheel H. However, in the case that the tire T is temporarily fixed on the wheel H, the inner side of the lower bead part of the tire T is positioned to be protruded toward the outside of the wheel H at the start position of the tire bead press roller 400 and the bead guide plate 600 so that the upper surface of the wheel H is opened.

Accordingly, the bead guide plate 600 can be positioned at the upper surface side of the wheel H utilizing this opened space, and thus, at start position (51), the tip end part of the arc-shaped plate piece 610 can be just positioned in a contact portion A (crossing point) between the outer periphery of the wheel H and the bead part of the tire T.

When the tire bead press roller 400 and the bead guide plate 600 are compelled to turnably driven (forwardly turnably driving) from this state, the bead guide plate 600 turns ahead of the tire bead press roller 400, so that the bead guide plate 600 is moved while the tip end thereof is inserted into the contact portion A between the outer periphery of the wheel H and the non-mounting side of the tire T. That is, the non-mounting side of the tire T positioned at the inner side of the wheel H is expanded to be aligned with the outer periphery side of the wheel H.

In this state, since the downward pressing force is applied to the tire T by the tire bead press roller 400, the non-mounting side of the tire T is guided so as to be slid from the surface side of the bead guide plate 600 (more exactly, nearer the upper surface outer side of the arc-shaped plate piece 610) which is positioned to overlap the upper surface side of the wheel H, so that it is very smoothly dropped in the inner side of the wheel H.

As a result, the lower bead side (rear side) of the tire T is fitted on the wheel H. The tire bead press roller 400 and the bead guide plate 600 are turnably driven by the rotation of the center cone shaft part 310 that is generated by the electric motor 340.

Since the bead guide plate 600 functions as a guide pallet for reducing friction, as mentioned above, the contact load of the tire T in the case of mounting the tire T on the wheel H is significantly reduced.

Incidentally, according to the measurement carried out by the inventor, if there is no bead guide plate 600, the contact load reaches about 100 Kg to the maximum of about 300 Kg (the maximum value in a specific direction of three dimensional directions of x, y and z when the contact load is divided into three dimensional directions). However, the maximum value according to the invention is reduced to about 20 Kg.

That is, since the non-mounting side of the tire T is guided so as to slide on the upper surface side of the arc-shaped plate piece 610 of the bead guide plate 600 without directly rubbing against the wheel H side, it is conjectured that the contact load (friction force) can be significantly reduced. Particularly, if the upper surface side of the arc-shaped plate piece 610 is formed of a convex curved surface as shown in FIG. 6, an excellent smoothness can be obtained owing to its curved surface effect.

Further, at this point in time, if a lubricating liquid such as liquid soap, a surface-active agent which is rich in smoothness, can be supplied to the bead guide plate 600 and the periphery thereof by atomizing or jetting it from the lubricating liquid supply means 700 such as the atomizer nozzle and the jetting ports provided on the bead guide plate 600 side, more excellent mounting of the tire T can be implemented.

Since the outer side of the lower bead part of the tire T has inherently a large strength, the reduction effect of the contact load does not produce a large influence in preventing the tire from being damaged.

The outer side of the bead part has a sufficient strength since it is exposed to the outside, while the inner side of the bead part does not have a sufficient strength, such as the strength of the outer side of the bead part, because it is positioned inside the wheel when the tire is mounted on the wheel.

However, since a large-sized and thick tire T is hard in the bead part and has a considerable rigidity, if the contact load is large, there is a possibility of generating a "rubbed mark" on the outside visible rubber portion. If the "rubbed mark" becomes conspicuous or the paint for characters at the "rubbed mark" becomes indistinct, the value of a product of the tire T is significantly reduced. Accordingly, there arises a case where the tire T might have to be exchanged for another, which causes the cost of the tire T to increase too much. In such a case, the supply of the lubricating liquid enhances the smoothness, so that the "rubbed mark" is hardly generated, which becomes very effective measures.

Further, owing to the reduction effect of the contact load, as described above, an overhaul for inspecting damages to the tire is not necessary. As a result, it is possible to achieve an additional cost reduction.

Still further, since such a reduction effect of the contact load is obtained, a complex speed control is also not necessary which has been made conventionally such as the slow-down of the driving speed so as to reduce the contact load, when the tire bead press roller 400 and the bead guide plate 600 are turnably driven. Additionally, since the bead guide plate 600 is structured to move on the upper surface side of the wheel H, the tire T can be mounted on the wheel H without being much influenced by the error of the dimensions of the wheel H. In other words, such a configuration does not require an accurate positional control of the tire relative to the wheel based on the accurate dimensions of the wheel H which has been measured beforehand. Accordingly, the tire mounter of the invention can easily cope with the wheels which are manufactured mainly by moulding and varied in dimensions.

Figure 10:
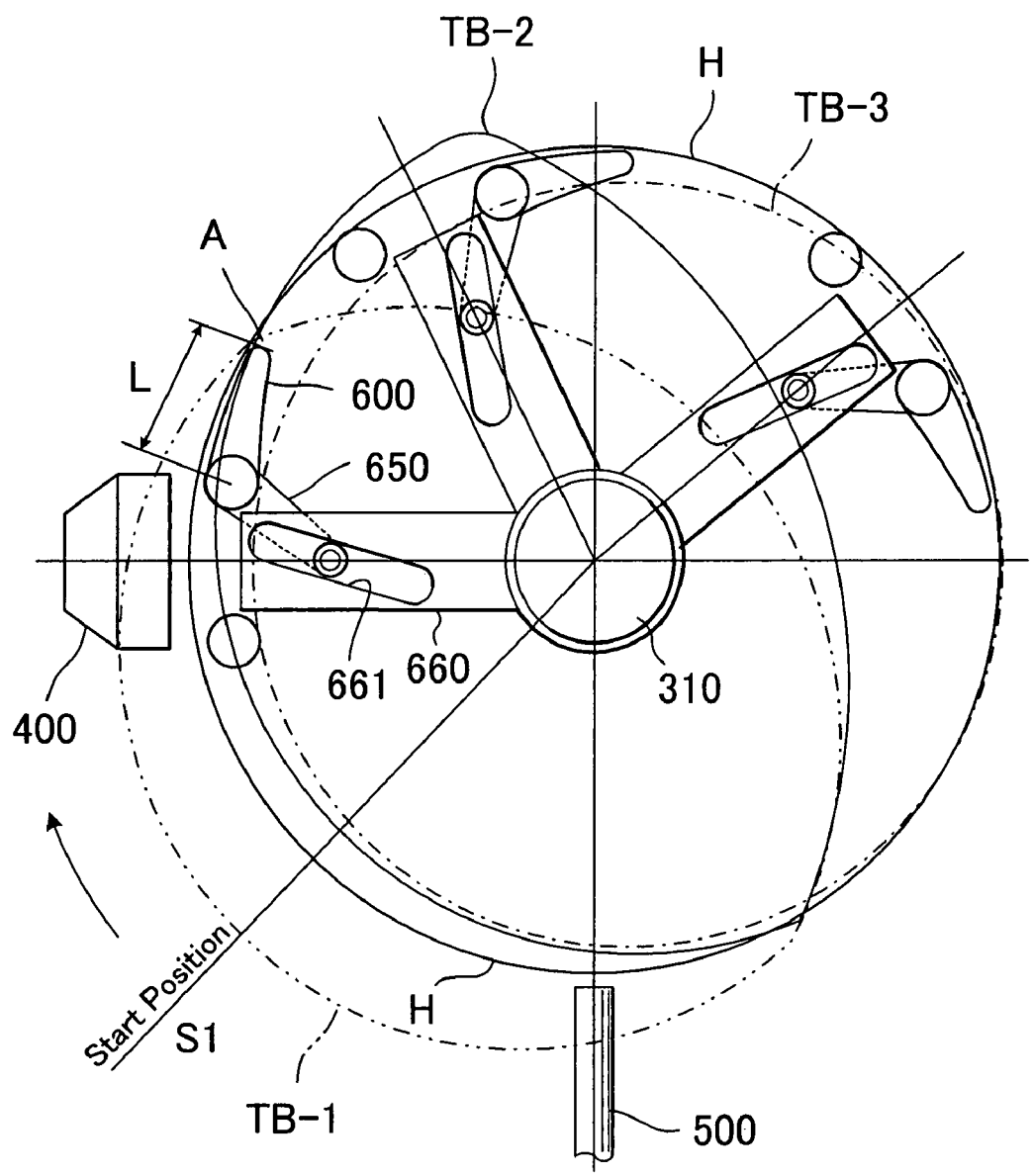
FIG. 10 is a view for explaining a trace of the bead guide plate of the invention.

The trace of the bead guide plate 600 when mounting the tire T on the wheel H is illustrated in FIG. 10. In this figure, there is described a state of the bead guide plate 600 in three points in the midway of the traveling thereof. L is a length of the arc-shaped plate piece 610 of the bead guide plate 600, A is a contact portion between the outer periphery of the wheel H and the bead part of the non-mounting side of the tire T into which the tip end of the arc-shaped plate piece 610 is inserted, and TB-1 to TB-3 are inner side (edge part) of the lower bead part of the tire T at the respective positions.

Upon completion of fitting the lower bead side of the tire T on the wheel H, fitting the upper bead side of the tire T on the wheel H starts. When fitting the upper bead side on the wheel H starts, in the case of a single bead guide plate 600, the bead guide plate 600 is backwardly turnably driven together with the tire bead press roller 400, so that they are returned to the start position S1 as shown in FIG. 9. The bead guide plate 600 is backwardly turnably driven by the reverse rotation of the center cone shaft part 310 caused by the reverse rotation of the electric motor 340.

Thereafter, upon completion of mounting the lower bead part of the tire T, the height of the upper bead side is reduced by the height of the lower bead part fitted on the wheel H, and hence in response thereto, the tire bead press roller 400, tire presser 500 and the tire receiver 800 are compelled to move downward at predetermined positions, respectively.

Figure 11:
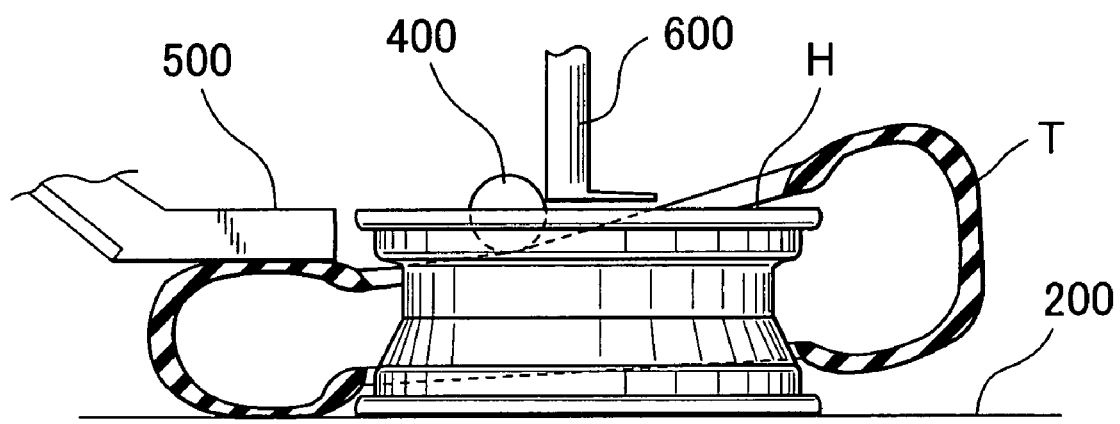
FIG. 11 is a partially longitudinal cross sectional view showing a state when the tire is mounted on the wheel by the tire bead press roller and the bead guide plate of the invention.

From this state, at the same time when the lower bead part of the tire T is fitted on the wheel H, the tire bead press roller 400 and the bead guide plate 600 may be turnably driven from the start position S1 shown in FIG. 9. By doing so, the bead guide plate 600 turns ahead of the tire bead press roller 400 and the non-mounting side of the upper bead part of the tire T is very smoothly engaged in the inner side of the wheel H. The midway of fitting the upper bead side is illustrated in FIG. 11.

Also at this point in time, a lubricating liquid such as liquid soap, a surface-active agent which is rich in smoothness, is preferably supplied to the bead guide plate 600 and the periphery thereof by the lubricating liquid supply means 700 such as the atomizer nozzle, and so forth. By doing so, fitting the upper bead side (surface side) of the tire T on the wheel H is completed.

Also in this case, the reduction effect of the contact load can be obtained like the case of fitting the lower bead part. However, since the inner side of the upper bead side of the tire T is mounted on the wheel H while contacting the outer periphery of the wheel H, the damage prevention effect of the large-sized tire T is expected. Since the inner side of the bead part of the tire T is not inherently exposed to the outside, it is a part having a large strength (a part to be easily damaged), and hence the generation of cracks can be significantly reduced owing to the reduction effect of the contact load. Particularly, since the inner side of the bead part cannot be visually seen from the outside upon completion of mounting, it is very troublesome that such cracks are found first when the abnormality of the tire occurs while moving the tire. Such a drawback can be solved fundamentally with this configuration.

When fitting the upper bead part of the tire T on the wheel H is completed, as mentioned above, the tire bead press roller 400, the bead guide plate 600, the tire presser 500 and the center cone 300 move upward, while the wheel brake mechanism 230 is released to cause the lift table 200 to move downward, so that the wheel H on the lift table 200 may be carried out considering that the tire T was mounted on the wheel H.

In the foregoing explanation, there is described a case of one bead guide plate 600, but another bead guide plate 600a can be provided in the manner that the additional bead guide plate 600a is spaced apart from the existing bead guide plate 600 at appropriate intervals while the base ends of the two bead guide plates 600, 600a are rendered symmetrical and opposed to each other, as shown in FIG. 4 and FIG. 9.

In the case of providing the two bead guide plates 600, 600a, the lower bead part of the tire T is first fitted on the wheel H by turnably driving (forwardly turnably driving) the bead guide plate 600 like the case of providing the single bead guide plate 600. Then, when backwardly turnably driving the same, namely, when the bead guide plate 600a is forwardly turnably driven, the upper bead part of the tire T can be fitted on the wheel H.

In this case, the structure becomes complex, and hence in the case of the small-sized tire, there occurs a problem that the tire is not easily fitted on the wheel using both of the bead guide plates with narrow space of such a small-sized tire. However, in the case of the large-sized tire, the tire can be fitted on the wheel without interference of both of the bead guide plates, so that a significant enhancement of operability owing to the reduction of mounting time is expected.

Meanwhile, in the case of mounting the tire T while the bead guide plates 600, 600a are forwardly or backwardly turnably driven, the tire T drops in the inner side of the wheel H upon completion of fitting the lower bead part of the tire T, so that the height of the upper bead part is lowered by the length of the dropping of the tire T, as mentioned above. Hence, in response thereto, it is necessary to cause the tire bead press roller 400, the tire presser 500 and the tire receiver 800 to move downward at the predetermined positions while the bead guide plates 600, 600a keep their heights.

Even in case of mounting the tire T described above with the two-motion mounting system where the upper and the lower bead parts of the tire T are mounted on the wheel H separately, the invention can employ the one-motion mounting system for mounting the upper and the lower bead parts at the same time by turnably driving the bead guide plate 600 at one time.

This one-motion mounting system is a method of fitting the upper and the lower bead parts of the tire T on the wheel H at the same time by the same operation as fitting the lower bead part of the tire T on the wheel H, as mentioned above.

This system is unsuitable for a large-sized and thick tire (radial tire, low-profile tire, and so forth), but it is possible to be used for a small-sized and thin tire. That is, if the lower bead part of the tire T is fitted on the wheel H by the operations of the tire bead press roller 400, the bead guide plate 600 and the tire presser 500 in the same manner as mentioned above, the small-sized thin tire is crushed flat with ease, so that the lower bead part is easily fitted on the wheel H and the upper bead part is also very smoothly mounted on the wheel H. Also, at this point in time, since the bead guide plate 600 functions as a guide pallet for reducing friction, the contact load can be significantly reduced.

At this point in time, if a lubricating liquid such as liquid soap, a surface-active agent which is rich in smoothness, is supplied to the bead guide plate 600 and the periphery thereof by the lubricating liquid supply means 700 such as an atomizer nozzle, more smooth mounting of the tire T can be implemented.

What is claimed is:

1. A tire mounter comprising:
    a lift table for receiving a wheel having a center hole and a tire provided thereon in a slanted orientation;
    a rotatable center cone aligned with the wheel center hole and movable in a vertical direction;
    a tire press roller for pressing against an upper bead side of the tire;
    a tire presser for pressing against the upper bead side of the tire; and
    a first bead guide plate comprising an arc-shaped plate piece having a tip end for insertion between the wheel and a bead part of the tire, said arc-shaped plate piece having a bottom surface side positioned at an upper surface side of the wheel and an outer peripheral arc-shaped part positioned at an outer peripheral surface of the wheel,
    wherein said first bead guide plate is moved along the bead part of the temporarily aslant tire at an unmounted side of the tire while being interlocked with a turning of the tire bead press roller, and thereby the first bead guide plate turns ahead of the tire bead press roller so that the bead part of the tire at the unmounted side of the tire slides on a surface side of the first bead guide plate to be mounted on the wheel.

2. The tire mounter according to claim 1, further comprising a lubricating liquid supply means for supplying a lubricating liquid to the first bead guide plate.

3. The tire mounter according to claim 1, further comprising a second bead guide plate spaced apart from the first bead guide plate and a base end part of the arc-shaped plate piece of the first bead guide plate is opposed to a base end part of an arc-shaped plate piece of the second bead guide plate.

4. The tire mounter according to claim 1, wherein said first bead guide plate includes an outer diameter adjustment mechanism which comprises:
    a cam plate fitted to a rotary shaft side of the center cone and having a guide cam part;

a lever piece mounted on the guide cam part, interlocked therewith and fixed to a base end part of the arc-shaped plate piece of the first bead guide plate in a substantially L-shape by a connection upright standing part; and an extendable mechanism of the first bead guide plate, wherein a turning radius of the first bead guide plate is varied in response to sizes of the tire and the wheel.

5. A method of mounting a tire provided aslant on a wheel using a mounter comprising a bead guide plate, the method comprising the steps of:

turning a tire bead press roller about a center cone;

mounting a lower bead part of the tire on the wheel by forwardly turnably driving the bead guide plate; and subsequently mounting an upper bead part of the tire on the wheel by backwardly turnably driving the bead guide plate, wherein the bead guide plate includes an arc-shaped plate piece, said arc-shaped plate piece having a bottom surface side positioned at an upper surface side of the wheel and an outer peripheral arc-shaped part positioned at an outer peripheral surface of the wheel, the bead guide plate being moved along a bead part of the aslant tire at an unmounted side of the tire while being interlocked with a turning of the tire bead press roller and thereby causing the bead guide plate to turn ahead of the tire bead press roller so that the bead part of the tire at the unmounted side of the tire slides on a surface side of the bead guide plate and is mounted on the wheel, the bead guide plate including an outer diameter adjustment mechanism comprising a cam plate fitted to a rotary shaft side of the center cone, a guide cam part of the cam plate, a lever piece mounted on the guide cam part, interlocked with the guide cam part and fixed to a base end part of the arc-shaped plate piece of the bead guide plate in a substantially L-shape by a connection upright standing part and an extendable mechanism of the bead guide plate, and the turning radius of the bead guide plate being varied in response to sizes of the tire and wheel.

6. A method of mounting a tire provided aslant on a wheel using a mounter comprising a bead guide plate, the method comprising the steps of:

turning a tire bead press roller about a center cone;

compressing the tire; and mounting a lower bead part and an upper bead part of the tire on the wheel by turnably driving the bead guide plate at one time, wherein the bead guide plate includes an arc-shaped plate piece, said arc-shaped plate piece having a bottom surface side positioned on an upper surface side of the wheel, and an outer peripheral arc-shaped part positioned on an outer peripheral surface of the wheel, the bead guide plate being moved along a bead part of the aslant tire at an unmounted side of the tire while being interlocked with a turning of the tire bead press roller and thereby causing the bead guide plate to turn ahead of the tire bead press roller so that the bead part of the tire at the unmounted side of the tire slides on a surface side of the bead guide plate and is mounted on the wheel, the bead guide plate including an outer diameter adjustment mechanism comprising a cam plate fitted to a rotary shaft side of the center cone, a guide cam part of the cam plate, a lever piece mounted on the guide cam part, interlocked with the guide cam part and fixed to a base end part of the arc-shaped plate piece of the bead guide plate in a substantially L-shape by a connection upright standing part and an extendable mechanism of the bead guide plate, and the turning radius of the bead guide plate being varied in response to sizes of the tire and wheel.

7. The method of mounting the tire on the wheel according to claim 5, further comprising the step of supplying a lubricating liquid to the bead guide plate.

8. The method of mounting the tire on the wheel according to claim 6, further comprising the step of supplying a lubricating liquid to the bead guide plate.

* * * * *